(12) United States Patent
Marsetti et al.

(10) Patent No.: US 11,078,023 B2
(45) Date of Patent: Aug. 3, 2021

(54) GUIDING DEVICE FOR BULK GOODS CONVEYORS

(71) Applicant: MOVEX S.P.A., Castelli Calepio (IT)

(72) Inventors: Matteo Marsetti, Telgate (IT); Sergio Marsetti, Paradiso (CH)

(73) Assignee: MOVEX S.P.A., Castelli Calepio (IT)

(*) Notice: Subject to any disclaimer, the term of this patent is extended or adjusted under 35 U.S.C. 154(b) by 0 days.

(21) Appl. No.: 16/925,594

(22) Filed: Jul. 10, 2020

(65) Prior Publication Data

US 2021/0009355 A1 Jan. 14, 2021

(30) Foreign Application Priority Data

Jul. 12, 2019 (IT) .......................... 102019000011673

(51) Int. Cl.
*B65G 21/20* (2006.01)
*B65G 21/00* (2006.01)

(52) U.S. Cl.
CPC ...... *B65G 21/2072* (2013.01); *B65G 2207/48* (2013.01)

(58) Field of Classification Search
None
See application file for complete search history.

(56) References Cited

U.S. PATENT DOCUMENTS

| 3,788,457 A | 1/1974 | Valentino, Jr. |
| 3,844,405 A | 10/1974 | Shuford |
| 5,137,145 A * | 8/1992 | Clopton ................. B65G 21/06 198/841 |
| 6,913,138 B2 | 7/2005 | Wiggins |
| 7,891,484 B2 * | 2/2011 | Ranger ................ B65G 51/035 198/861.1 |
| 9,422,110 B2 * | 8/2016 | Marsetti ............. B65G 21/2054 |

FOREIGN PATENT DOCUMENTS

| EP | 3127839 A1 | 2/2017 |
| WO | 0179086 A1 | 10/2001 |

* cited by examiner

*Primary Examiner* — Kavel Singh
(74) *Attorney, Agent, or Firm* — Dickinson Wright PLLC

(57) ABSTRACT

A guiding device for a goods conveyor includes a support coupling with a fixed structure of the conveyor at least one sliding profile manufactured as a separate component with respect to the support structure and arranged for coupling with at least one corresponding grooved guide formed on the second side of such support structure and is oriented along the second axis. The grooved guide extends over the entire length of the support structure and includes a central rib arranged to abut against the rear surface of a respective sliding profile. The central rib divides the respective grooved guide into two cavities each having an L-shaped cross-section, so that linear projections are arranged to be inserted into a corresponding cavity of the grooved guide so that the free ends of the linear projections abut against respective abutment walls of the cavities.

9 Claims, 4 Drawing Sheets

GUIDING DEVICE FOR BULK GOODS CONVEYORS

This application claims priority to Italian application no. 102019000011673 filed on Jul. 12, 2019, the entirety of which is incorporated herein by reference.

TECHNICAL FIELD

The present invention generally refers to bulk goods conveyors and, more specifically, to a guiding device for a bulk goods conveyor.

BACKGROUND

It is known that a bulk goods conveyor defines a movement plane for generic goods to be transported. Such a conveyor is generally a closed ring or endless ring one and possibly comprises, for instance, a belt, a plurality of interconnected rollers or a chain with articulated links.

In bulk goods conveyors, the use is also known of guiding devices that provide containment and/or conveyance of the goods being transported. The guiding devices define respective sliding surfaces which are substantially orthogonal to the movement plane of the conveyor and develop along the desired direction of movement of the goods being transported. The guiding devices develop along a direction which is either a straight line, an open broken line, or a curve, depending on the actual needs.

In particular, a practice is known of using lateral guiding devices, or sideboards, and central guiding devices, or partition guides. Usually the lateral guides or sideboards feature a single sliding surface, whereas the partition or lateral guides feature two sliding surfaces, opposite and substantially parallel to each other. The central guides are positioned, for instance, at the forks of the conveyor, i.e. wherever a stream of goods is to be split into two separated streams. For instance, the sliding surfaces can be used in lines for conveying bottles containing different liquids as protect-label surfaces.

In one typical embodiment, the (lateral or central) guiding devices comprise a support portion, which can be implemented by a first, usually low-cost, material, and one or several sliding surfaces, which can be obtained by way of vertical profiles made from a second material having a higher molecular mass, hence a "noble" and more expensive material with respect to the first material. This is due to the fact that the sliding surfaces, which form the contacting and rubbing parts that get in contact and rub with the products which transit on the conveyor, shall provide satisfactory sturdiness and durability even for the mechanical stresses they are subjected to. Vice-versa, since the support portion has the only function of supporting its respective sliding surfaces and usually does not get in contact with the products being transported by the conveyor, such support portion provides satisfactory performances even if it is manufactured with a material having a reduced molecular mass, hence less "noble", as compared with the material with which the sliding surfaces are manufactured.

Therefore, in the above-described embodiment the sliding surfaces are manufactured as separate components with respect to the support portion and can be engaged on such support portion along an axial direction, i.e. by making it to slide on such support portion. In this coupling system the support portion is provided with a special insertion guide, oriented in fact along an axial direction, for inserting a respective sliding surface.

Embodiments of sliding coupling systems for coupling the sliding surfaces and their respective support portion are described, for example, in documents WO 01/79086 A1, U.S. Pat. No. 6,913,138 B2, U.S. Pat. No. 3,788,457 A and EP 3127839 A1. On the contrary, another sliding coupling system for coupling the sliding surfaces and their respective support portion, as that described for instance in U.S. Pat. No. 3,844,405 A, uses screws and bolts.

A problem of the coupling systems described above, be they implemented by means of screws or bolts or by means of a sliding movement, is related to the difficulty of coupling and decoupling each sliding surface with/from the support portion. As a matter of fact, should the coupling means be screws and bolts, it is apparent that these coupling means require a long time and a significant ability by the operator for obtaining the coupling, but also the decoupling, between each sliding surface and the support portion. In the event of sliding movement, the significant length in the axial direction of each sliding surface and its respective support portion (such as, for instance, those illustrated in the above-mentioned prior art document WO 01/79086 A1) make in any case the coupling and decoupling operations difficult, for instance in the event that the sliding surface has to be replaced.

In addition, if the sliding surface should be manufactured from a plastic material, each sliding surface must include a particularly thick coupling portion (see, for instance, those illustrated in the above-mentioned prior art document U.S. Pat. No. 6,913,138 B2) in order to be insertable into the corresponding inserting guide formed on the support portion. In the stage of fabrication of the sliding surface and due to the different cooling-down times as a function of the different thicknesses of the plastic material, this particularly thick coupling portion may give rise to deformations or "flarings" on such sliding surface. These deformations or "flarings" jeopardize the planarity of the sliding surface and may result in damages of the goods being transported by the conveyor.

SUMMARY

An object of the present invention is thus to provide an improved guiding device for a bulk goods conveyor that is capable of solving the above-mentioned drawbacks of the known art in an extremely simple, cost-effective, and particularly functional manner.

In details, an object of the present invention is to provide an improved guiding device for a bulk goods conveyor which make the coupling between the sliding surfaces and their respective support portions of such guiding device, simpler and stabler, as compared to the embodiments according to the prior art.

Another object of the present invention is to provide an improved guiding device for a bulk goods conveyor capable of preventing any deformations of the sliding surfaces in the use configuration of the conveyor.

These objects according to the present invention are achieved by implementing an improved guiding device for a bulk goods conveyor as set forth in claim 1.

Further characteristics of the invention are highlighted in the dependent claims, which are an integrant part of the present disclosure.

BRIEF DESCRIPTION OF DRAWINGS

The characteristics and advantages of an improved guiding device for a bulk goods conveyor according to the present invention will be more apparent from the following, explanatory, non-limiting description, which makes reference to the attached schematic drawings, wherein.

DETAILED DESCRIPTION

Figure 1:
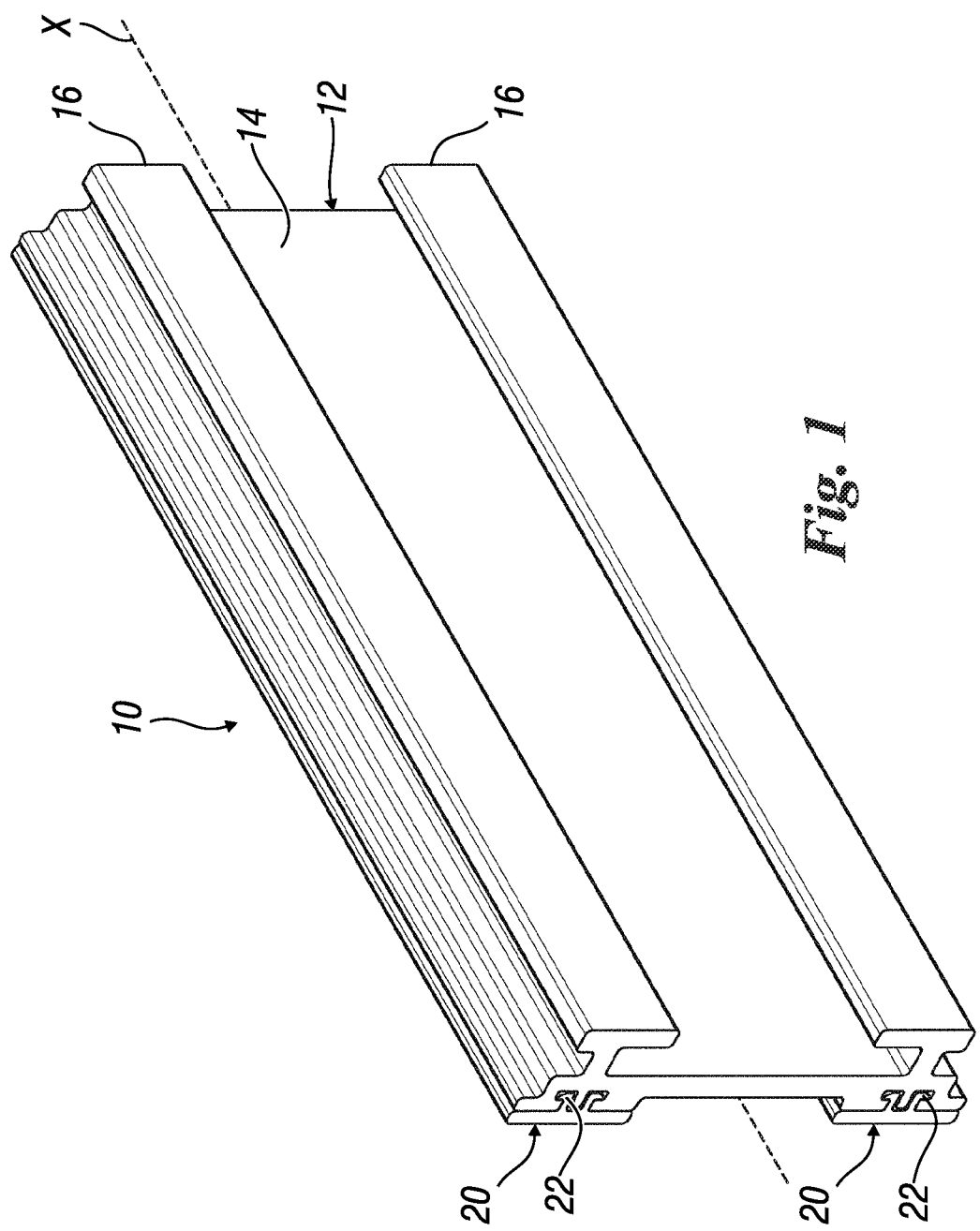
FIG. 1 is a perspective view, from the rear side, of a preferred embodiment of the improved guiding device for a bulk goods conveyor according to the present invention.
Figure 2:
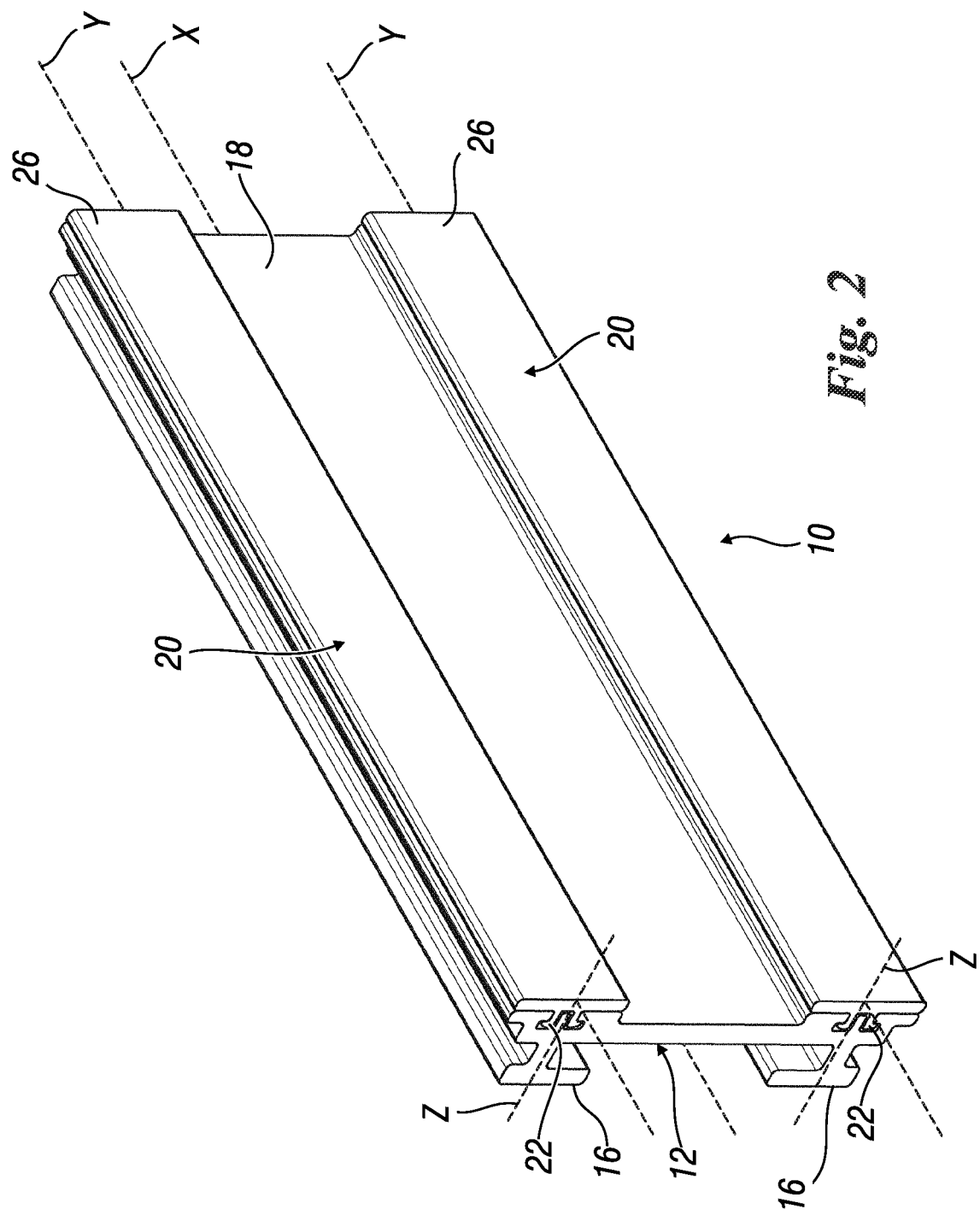
FIG. 2 is a perspective view, from the front side, of the guiding device depicted in FIG. 1.
Figure 3:
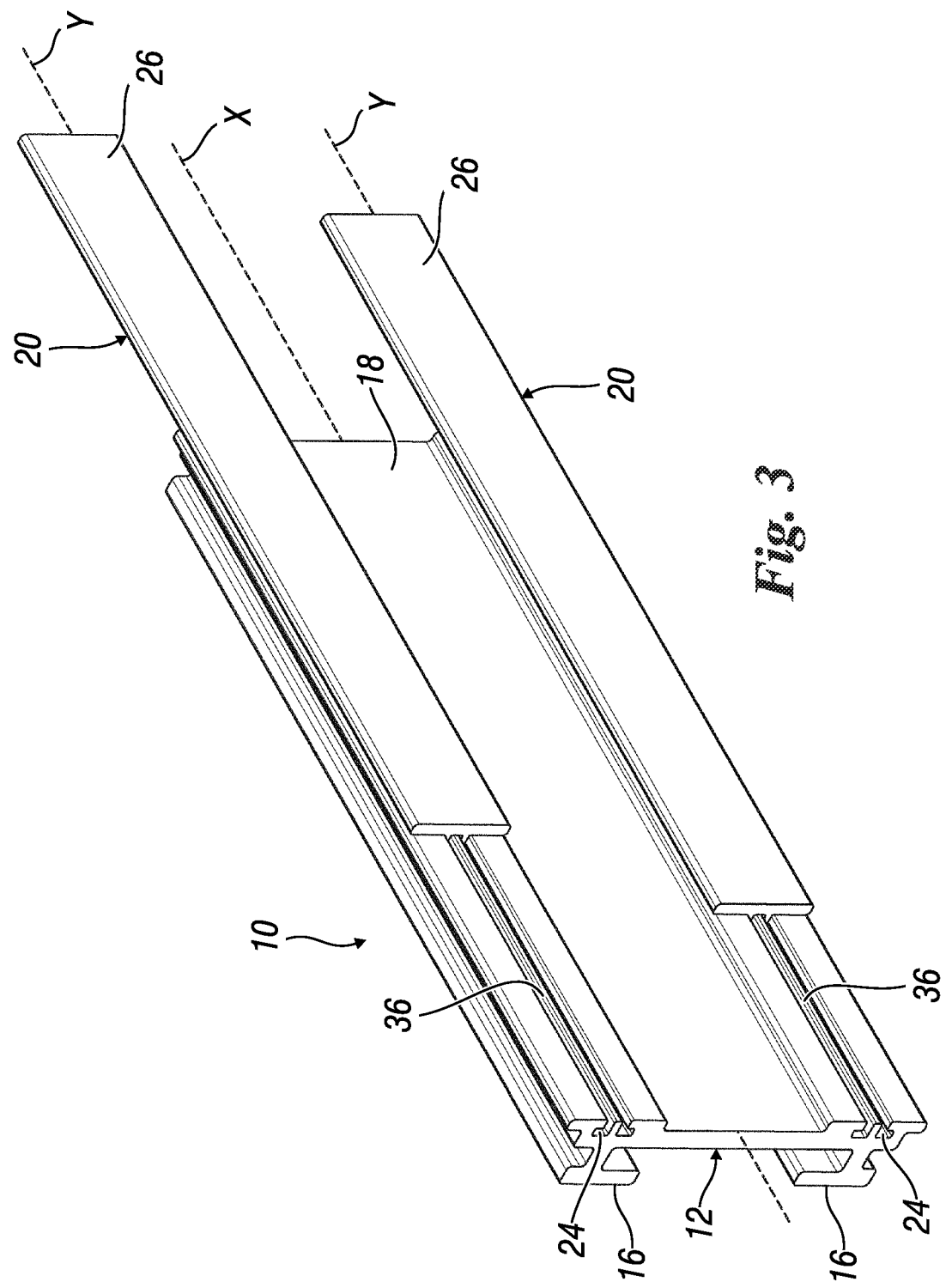
FIG. 3 is a further perspective view, from the front side, of the guiding device depicted in FIG. 1, wherein the coupling means between the sliding surfaces and their respective support portion of such guiding device are highlighted.
Figure 5:
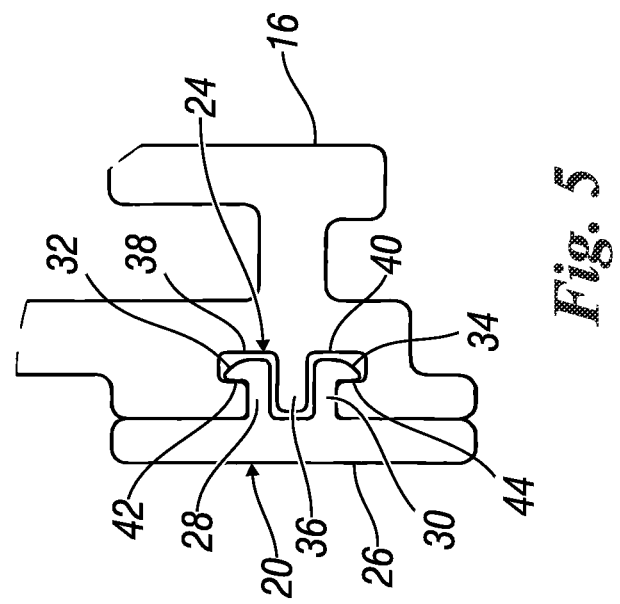
FIG. 5 is an amplified view of a detail identified by the reference V in FIG. 4.
Figure 4:
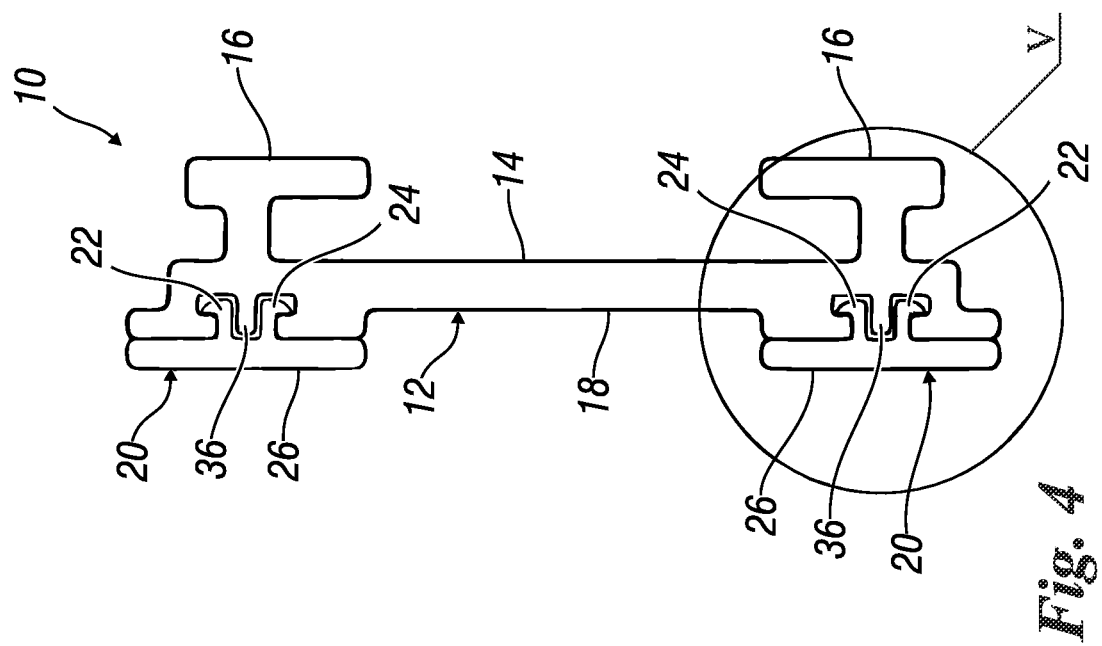
FIG. 4 is a cross sectional view of the guiding device depicted in FIG. 1.

With reference to the figures, they show a preferred embodiment of the improved guiding device for a bulk goods conveyor according to the present invention. The guiding device is identified by reference number 10, as a whole.

The guiding device 10 is of the type comprising a support structure 12 which extends along a first predefined axis X, typically parallel to the axis of development and of movement of the conveyor with which the guiding device 10 can be coupled. The axis of development X of the support structure 12 develops along either a straight line, an open broken line, or a curve, depending on the shape of the conveyor with which the guiding device 10 can be coupled. Irrespective of its shape and length, the support structure 12 comprises, on a first side 14 thereof, i.e. the rear side, coupling means 16 for being coupled with a fixed structure of the conveyor. As the figures show, the coupling means 16 consist of a channel arranged for being connected, by way of a sliding coupling, to a corresponding fixed structure of the conveyor.

On a second side 18 of the support structure 12, which is opposite with respect to the first side 14 and which substantially coincides with the front side that contains and/or conveys the goods being transported, is provided at least one sliding profile 20 which is oriented along a respective second axis Y substantially parallel to the first axis of development X of the support structure 12. Each sliding profile 20 is manufactured as a separate component with respect to the support structure 12 and is provided with second coupling means 22 arranged for being coupled with at least one corresponding grooved guide 24 which is formed on the second side 18, or front side, of such support structure 12. The grooved guide 24 is oriented along the second axis Y of the sliding profile 20, hence substantially parallel to the first axis of development X of the support structure 12.

The second coupling means 22 of each sliding profile 20 are flexible coupling means, arranged for the removable, interlocking or snap, coupling of such sliding profile 20 on the support structure 12 along a third axis Z that is substantially perpendicular both to the first axis X and to the second axis Y. In other words, each sliding profile 20 can be mounted on the support structure 12 in a direction perpendicular to the first axis of development X of the latter, i.e. without the sliding movement in the axial direction on such support structure 12 being necessary.

In details, each sliding profile 20 is provided with a substantially plane front surface 26, which the goods being transported rub on, and with a rear surface opposite with respect to such substantially plane front surface 26, which the second coupling means 22 are formed on. Therefore, the second coupling means 22 of each sliding profile 20 consist of a pair of linear protrusions 28 and 30, integrally formed in a single piece with such sliding profile 20 and extending over the entire length, along the second axis Y, of the sliding profile 20 itself. Each linear projection 28 and 30 has a hook-shaped cross-section, with respective free ends 32 and 34 diverging from each other.

The grooved guide 24 extends over the entire length, along the first axis X, of the support structure 12. The grooved guide 24 is provided with at least one central rib 36, integrally formed in a single piece with the support structure 12 and extending too over the entire length, along the first axis X, of such support structure 12. The central rib 36 is arranged to abut against the rear surface of a respective sliding profile 20 in the assembled configuration of such sliding profile 20 on the support structure 12. Therefore, the function of the central rib 36 is that of preventing deformations or "flarings" on the front surface 26 of the sliding profile 20 in said mounted configuration.

The central rib 36 divides the respective grooved guide 24 into two cavities 38 and 40 each having an L-shaped cross-section. Each linear projection 28 and 30 of the second coupling means 22 is thus arranged to be inserted, by means of an elastic deformation, into a corresponding cavity 38 and 40 of the grooved guide 24 so that the free ends 32 and 34 abut against respective abutment walls 42 and 44 of such cavities 38 and 40. In such a way, also thanks to the fact that the central rib 36 keeps divaricating the linear protrusions 28 and 30, thus preventing them from getting closer to each other, an accidental detachment is prevented, along a third axis Z, of each sliding profile 20 from the respective support structure 12.

The support structure 12 is preferably manufactured with a first polymeric material, usually a low-cost material, which is different with respect to a second polymeric material having resilience properties, usually more "noble", hence more expensive, with which each sliding profile 20 is manufactured. In particular, the second polymeric material with which each sliding profile 20 is manufactured has a higher molecular mass and a lower friction coefficient as compared with those of the first polymeric material with which the support structure 12 is manufactured. In addition, this second polymeric material is added with lubricating substances, so as to further reduce its friction coefficient and the effects generated by the rubbing of the products on each sliding profile 20.

On the other side, each sliding profile 20 features a hardness which is lower than that of the support structure 12. However, this circumstance is due more to the geometry and the conformation of these two components, rather than the inherent characteristics of the respective polymeric materials.

Each sliding profile 20 can be placed at any part (above, below, in the middle, etc.) of the second side 18 of the support structure 12. The height H of each sliding profile 20 can also vary depending on the actual requirements. In the embodiment shown in the figures, on a single support structure 12 there are two distinct sliding profiles 20 provided, positioned at opposite ends of the second side 18 of the support structure 12. In other words, the guiding device 10 being in the assembled configuration on the conveyor, on the same support structure 12 a lower sliding profile 20 and an upper sliding profile 20 are obtained.

It is thus seen that the improved guiding device for a bulk goods conveyor according to the present invention achieves the previously highlighted objects.

A thus conceived improved guiding device for a bulk goods conveyor according to the present invention is susceptible of numerous modifications and variants, all falling within the same inventive concept; also, all details are replaceable by technically equivalent elements. In practice the materials used, as well as shapes and dimensions, might be whatsoever depending on the technical requirements.

The scope of protection of the invention is therefore that set forth in the attached claims.

The invention claimed is:

1. A guiding device (10) for a product conveyor, the guiding device (10) comprising a support structure (12) extending along a first predefined axis (X), said support structure (12) comprising, on a first side (14) thereof, first coupling means (16) for coupling with a fixed structure of the conveyor and, on a second side (18) thereof opposite to said first side (14), at least one sliding profile (20) oriented along a respective second axis (Y) which is parallel to said first predefined axis (X), wherein said at least one sliding profile (20) is manufactured as a separate component with respect to said support structure (12) and wherein said at least one sliding profile (20) is provided with second coupling means (22) arranged for being coupled with at least one corresponding grooved guide (24) which is formed on the second side (18) of said support structure (12) and is oriented along said second axis (Y), wherein said second coupling means (22) are flexible coupling means arranged for the removable, interlocking or snap, coupling, of said at least one sliding profile (20) on said support structure (12) along a third axis (Z) which is perpendicular both to said first axis (X) and to said second axis (Y), and wherein each sliding profile (20) is provided with a rear surface on which said second coupling means (22) are formed, wherein said at least one grooved guide (24) extends over the entire length, along the first axis (X), of the support structure (12), said grooved guide (24) being provided with at least one central rib (36), which is integrally formed in a single piece with said support structure (12) and which also extends over the entire length, along said first axis (X), of said support structure (12), said central rib (36) being arranged to abut against the rear surface of a respective sliding profile (20) in the assembled configuration of said sliding profile (20) on said support structure (12), wherein said central rib (36) divides the respective grooved guide (24) into two cavities (38, 40) each having an L-shaped cross-section, wherein each linear projection (28, 30) of the second coupling means (22) is arranged to be inserted, by means of elastic deformation, into a corresponding cavity (38, 40) of the grooved guide (24) so that the free ends (32, 34) of said linear projections (28, 30) abut against respective abutment walls (42, 44) of said cavities (38, 40).

2. The guiding device (10) according to claim 1, characterized in that each sliding profile (20) is provided with a flat front surface (26) opposite to said rear surface, on which the goods being transported crawl.

3. The guiding device (10) according to claim 2, characterized in that the second coupling means (22) of each sliding profile (20) comprises a pair of linear projections (28, 30), integrally formed in a single piece with said sliding profile (20) and extending over the entire length, along the second axis (Y), of said sliding profile (20).

4. The guiding device (10) according to claim 3, characterized in that each linear projection (28, 30) has a hook-shaped cross-section, with respective free ends (32, 34) diverging from each other.

5. The guiding device (10) according to claim 1, characterized in that the support structure (12) is manufactured with a first polymeric material which is different with respect to a second polymeric material with which each sliding profile (20) is manufactured, wherein said second polymeric material has resilience properties.

6. The guiding device (10) according to claim 5, characterized in that the second polymeric material with which each sliding profile (20) is manufactured has a higher molecular mass and a lower friction coefficient with respect to those of the first polymeric material with which the support structure (12) is manufactured.

7. The guiding device (10) according to claim 6, characterized in that said second polymeric material is added with lubricating substances, so as to further reduce its friction coefficient and the effects generated by the rubbing of the products on each sliding profile (20).

8. The guiding device (10) according to claim 1, characterized in that on a single support structure (12) there are two distinct sliding profiles (20) provided, positioned at opposite ends of the second side (18) of said support structure (12), so that in the assembled configuration of the guiding device (10) on the conveyor there are a lower sliding profile (20) and an upper sliding profile (20) on the same support structure (12).

9. A guiding device (10) for a product conveyor, the guiding device (10) comprising a support structure (12) extending along a first predefined axis (X), said support structure (12) comprising, on a first side (14) thereof, first coupling means (16) for coupling with a fixed structure of the conveyor and, on a second side (18) thereof opposite to said first side (14), at least one sliding profile (20) oriented along a respective second axis (Y) which is parallel to said first predefined axis (X), wherein said at least one sliding profile (20) is manufactured as a separate component with respect to said support structure (12) and wherein said at least one sliding profile (20) is provided with second coupling means (22) arranged for being coupled with at least one corresponding grooved guide (24) which is formed on the second side (18) of said support structure (12) and is oriented along said second axis (Y), wherein said second coupling means (22) are flexible coupling means arranged for the removable, interlocking or snap, coupling, of said at least one sliding profile (20) on said support structure (12) along a third axis (Z) which is perpendicular both to said first axis (X) and to said second axis (Y), wherein each sliding profile (20) is provided with a rear surface on which said second coupling means (22) are formed, wherein the second coupling means (22) of each sliding profile (20) comprises a pair of linear projections (28, 30), integrally formed in a single piece with said sliding profile (20) and extending over the entire length, along the second axis (Y), of said sliding profile (20), wherein said at least one grooved guide (24) extends over the entire length, along the first axis (X), of the support structure (12), said grooved guide (24) being provided with at least one central rib (36), which is integrally formed in a single piece with said support structure (12) and which also extends over the entire length, along said first axis (X), of said support structure (12), said central rib (36) being arranged to abut against the rear surface of a respective sliding profile (20) in the assembled configuration of said sliding profile (20) on said support structure (12), wherein said central rib (36) divides the respective grooved guide (24) into two cavities (38, 40) each having an L-shaped cross-section, wherein each linear projection (28, 30) of the second coupling means (22) is arranged to be inserted, by means of elastic deformation, into a corresponding cavity (38, 40) of the grooved guide (24) so that the free ends (32, 34) of said linear projections (28, 30) abut against respective abutment walls (42, 44) of said cavities (38, 40), and wherein said central rib (36) keeps divaricating said linear projections (28, 30), thus preventing said linear projections (28, 30) from getting closer to each other and preventing an accidental detachment, along said third axis (Z), of said sliding profile (20) from the respective support structure (12).

\* \* \* \* \*